D. H. LEVY.
CAR-BRAKES.
No. 183,181.  Patented Oct. 10, 1876.
Fig: 1.
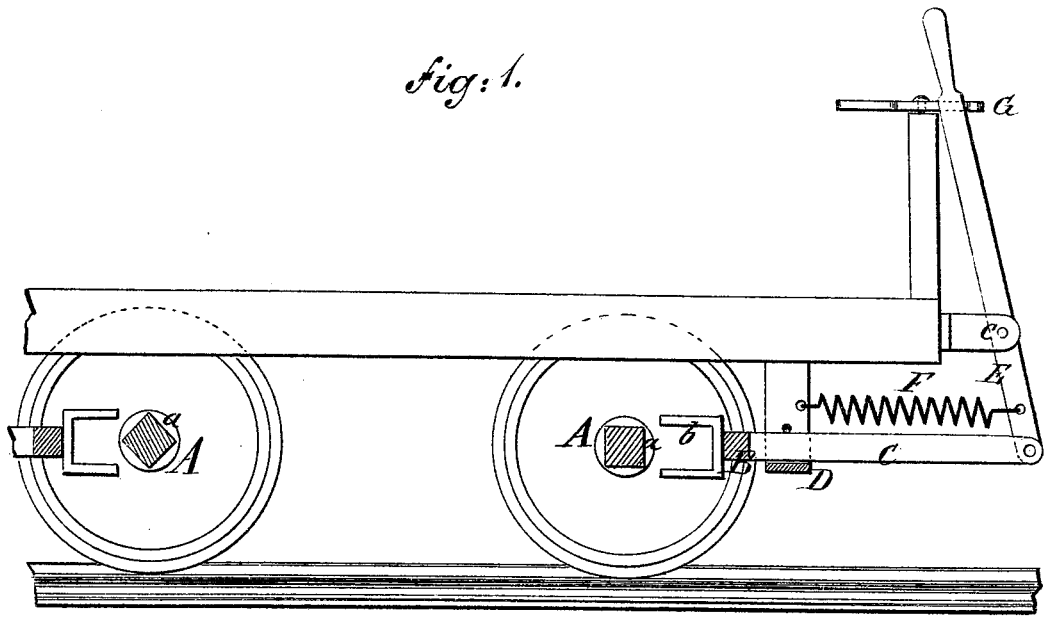
Fig: 2.
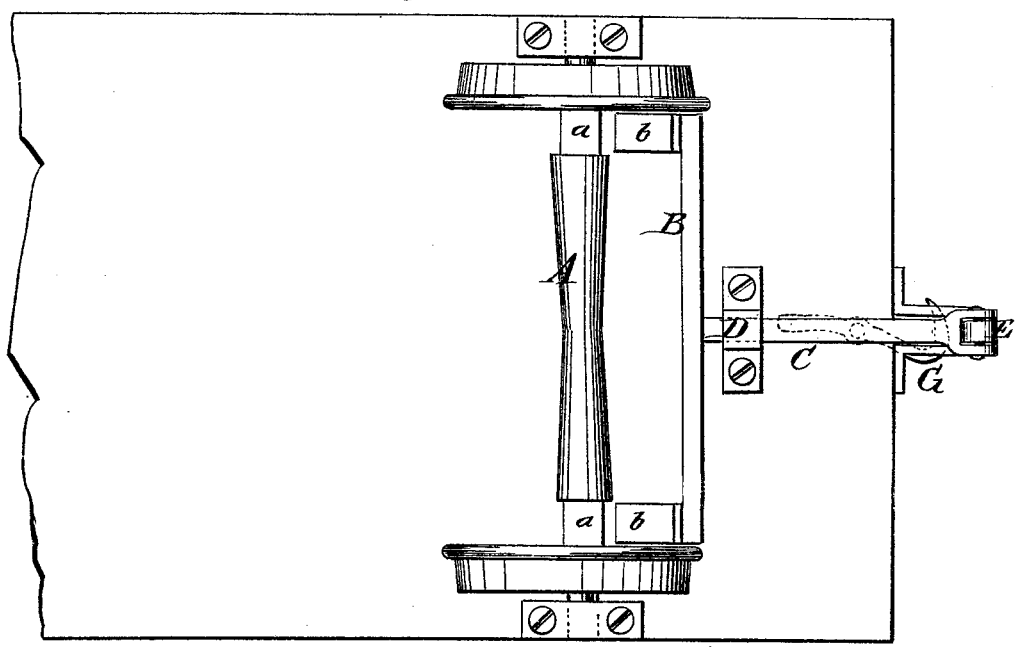
WITNESSES:
Chas. Nida.
John Goethals
INVENTOR:
D. H. Levy
BY Munn & Co
ATTORNEYS.

UNITED STATES PATENT OFFICE.

DAVID H. LEVY, OF NEW YORK, N. Y., ASSIGNOR TO HIMSELF AND EDWARD W. LINZNER, OF SAME PLACE.

IMPROVEMENT IN CAR-BRAKES.

Specification forming part of Letters Patent No. 183,181, dated October 10, 1876; application filed September 16, 1876.

*To all whom it may concern:*

Be it known that I, DAVID H. LEVY, of the city, county, and State of New York, have invented a new and Improved Safety-Brake, of which the following is a specification:

Figure 1 is a side elevation in section of a car showing the application of my improved safety-brake. Fig. 2 is a bottom view.

Similar letters of reference indicate corresponding parts.

My invention relates to that class of brakes which are applied to cars for stopping them in the shortest possible time; and it consists of an arrangement of clutches or wrenches attached to a sliding bar and capable of being instantly thrown forward by a spring to engage with a squared portion of the car-axle, or to a square block bolted to the axle, the object being to stop a car in case of emergency in the shortest possible time.

Referring to the drawing, A is the car-axle, which is squared at *a a* or provided with a square block bolted to it or to the wheel. B is a cross-bar carrying the wrenches or clutches *b*, which are of such size as to fit loosely the square part of the axle.

The cross-bar B is attached to a sliding rod, C, that slides in ways D, and is connected at its outer end with the lever E, which is fulcrumed at *c*, and is provided with the spring F, one end of which is attached to some portion of the car, and which draws the lower end of the lever toward the car-axle. A hook, G, pivoted to the railing of the car-platform, holds the lever back, and prevents the clutches from engaging with the squared portion of the car-axle. In a case of emergency the hook G is tripped, and the lever being liberated, is drawn by the spring, causing the clutch to engage the square part of the axle, and preventing the further rotation of the wheels. The car is thus almost instantly stopped.

Having thus described my invention, I claim as new and desire to secure by Letters Patent—

1. The combination of a clutch, thrown forward by a spring to engage with the squared portion of the car-axle, substantially as shown and described.

2. The combination of the squared axle A, clutches *b*, bars B and C, lever E, spring F, and catch G, substantially as herein shown and described.

DAVID H. LEVY.

Witnesses:
C. SEDGWICK,
GEO. M. HOPKINS.